Oct. 19, 1954     A. GOERG ET AL     2,692,276
PROCESS FOR THE MANUFACTURE OF ACRYLONITRILE
Filed July 19, 1951     2 Sheets—Sheet 1
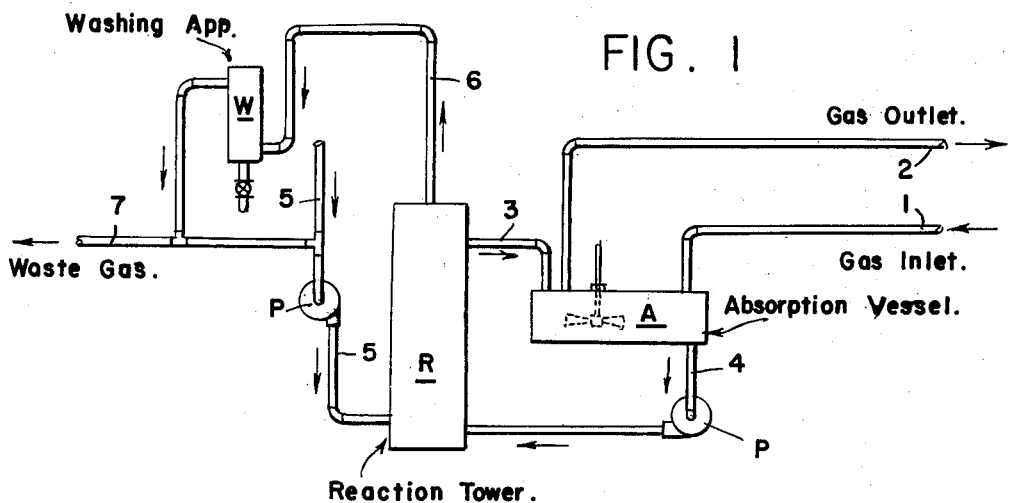
FIG. 1
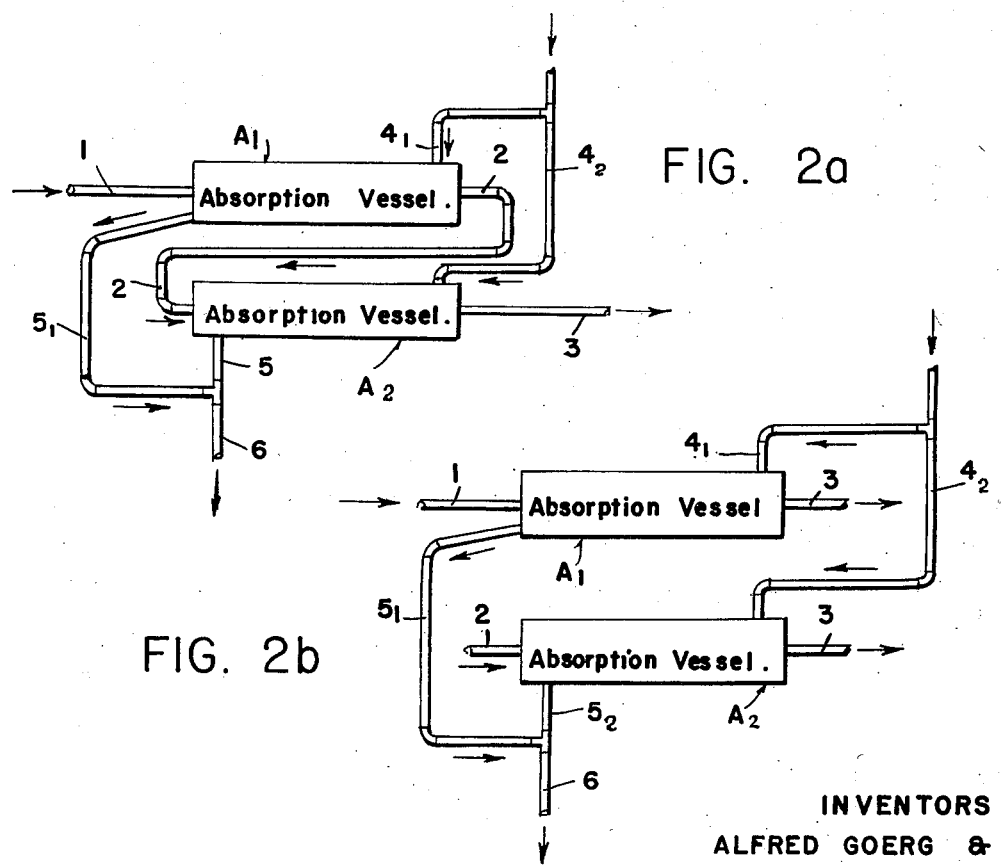
FIG. 2a
FIG. 2b
INVENTORS
ALFRED GOERG &
ARWED GROB,
BY Wenderoth, Lind & Ponack
ATTORNEYS Patented Oct. 19, 1954

2,692,276

UNITED STATES PATENT OFFICE 2,692,276

PROCESS FOR THE MANUFACTURE OF ACRYLONITRILE

Alfred Goerg, Marendeux, near Monthey, and Arwed Grob, Tormaz, near Monthey, Switzerland, assignors to Ciba Limited, Basel, Switzerland, a Swiss firm Application July 19, 1951, Serial No. 237,636

Claims priority, application Switzerland July 19, 1950

9 Claims. (Cl. 260—465.3)

It is known that acrylonitrile can be made by the action of acetylene on hydrogen cyanide in the presence of an aqueous cuprous chloride catalyst in accordance with the equation

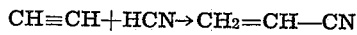

The reaction is advantageously carried out at about 80–100° C. The known process can be carried out continuously or discontinuously.

Among the cuprous chloride catalysts hitherto used for this synthesis the so-called Nieuwland catalyst has been found especially suitable. In the form most frequently used this catalyst consists of a mixture of 45.5 parts of cuprous chloride, 24.5 parts of ammonium chloride, 2.4 parts of concentrated hydrochloric acid and 42 parts of water, all the parts being by weight. However, the ammonium chloride may be replaced by an equivalent quantity of a mixture of potassium chloride and sodium chloride, and instead of hydrochloric acid there may be used other strong acids, such as hydrobromic acid, sulfuric acid or phosphoric acid. Depending on the reaction conditions used the relative proportions of the components contained therein may vary within certain limits.

In the discontinuous process an aqueous cuprous chloride catalyst is charged at ordinary temperature with equivalent quantities of acetylene and hydrocyanic acid, both of which are used in concentrated form, and then the reaction mixture is heated at 70–100° C. In this manner acrylonitrile is formed, and is distilled off together with water and unreacted hydrocyanic acid and acetylene. The yield of acrylonitrile in this process does not amount to more than about 30 per cent.

In the continuous process the catalyst mixture is heated in a reaction tower at 70–100° C., and acetylene is passed through the hot mixture and hydrocyanic acid is simultaneously introduced dropwise. The acrylonitrile formed is removed from the reaction tower by the current of acetylene, dissolved out by absorption in water or by being condensed out of the gas stream, and isolated by fractional distillation, the excess of acetylene being returned to the reaction tower. In this process the acetylene may be diluted by the addition of an inert gas such as nitrogen.

Both processes have the disadvantage that the hydrocyanic acid must be used in the form of a concentrated aqueous solution or in an anhydrous liquid or concentrated gaseous form. This is inconvenient because in commercially important processes for producing hydrocyanic acid it is not obtained directly in a concentrated form, but in a gaseous mixture in a dilute form. The dilute hydrocyanic acid must therefore be concentrated before being used for the synthesis of acrylonitrile.

Such a gaseous mixture containing hydrocyanic acid may, for example, be passed through a solution of an alkali or alkaline earth metal compound to absorb the hydrocyanic acid with the formation of an alkali cyanide or alkaline earth metal cyanide. The hydrocyanic acid must then be liberated from such solutions by the addition of a mineral acid. This concentrating operation naturally leads to an undesired increase in the cost of the whole process.

If an attempt is made to utilise the hydrocyanic acid from such gases containing only small amounts of hydrocyanic acid without previous concentration by way of an alkali cyanide or alkaline earth metal cyanide, for example, by passing directly into the hot Nieuwland catalyst the gaseous mixture, which results from the synthesis of hydrocyanic acid in an electric arc by the method of Andriessen (British Pat. No. 296,-355), and which contains about 0.5 to 1.5 per cent. by volume of hydrocyanic acid and about 2 to 12 per cent. by volume of acetylene, very unsatisfactory yields of acrylonitrile are obtained, probably owing to the great dilution of the reaction components and the reaction product.

The present invention is based on the unexpected observation that acrylonitrile can be made by the additive combination of hydrocyanic acid and acetylene in the presence of an aqueous cuprous salt catalyst with the use of dilute gaseous hydrocyanic acid, if in a first stage of the process the hydrocyanic acid is absorbed from the gas in the cuprous salt catalyst at a temperature at which the speed of formation of acrylonitrile is not considerable, and then carrying out the reaction with acetylene in a second stage.

The expression "dilute gaseous hydrocyanic acid" is used herein to denote gases which contain less than 20 per cent. and usually only about 0.3 to 5 per cent. of hydrocyanic acid.

As temperatures at which the speed of formation of acrylonitrile is not considerable i. e., at which the production of acrylonitrile proceeds only slowly, there are to be considered temperatures below about 60–65° C.; and temperatures of about 70° C. and higher temperatures are to be designated as temperatures at which the production of acrylonitrile proceeds fairly well.

The process may be carried out continuously or discontinuously. It is of advantage to use as the catalyst the cuprous chloride catalyst of Nieuwland. It is also possible to use the catalyst in a more dilute form, but preferably the density of the catalyst should not fall below 1.4. In this discontinuous form of the process the dilute gaseous hydrocyanic acid is introduced into the cuprous chloride catalyst advantageously at a temperature not substantially exceeding 60° C., and preferably at room temperature. It is of advantage to pass the gas stream through the catalyst until approximately 30 grams of material have been absorbed per liter of catalyst. The gas stream is then shut off and the reaction mixture heated to about 70–100° C., and acetylene is then introduced into the hot catalyst mixture. The acetylene leaving the reaction mixture carries away the acrylonitrile formed. When acrylonitrile is no longer formed the current of acetylene is stopped, and the catalyst is cooled and recharged with hydrocyanic acid.

In carrying out the process continuously it is of advantage to introduce the gas containing hydrocyanic acid into a special absorption vessel through at least a part of the aqueous cuprous chloride catalyst of Nieuwland, the hydrocyanic acid being absorbed by the catalyst with the formation of cuprous cyanide or other compounds derived from cuprous salts and hydrocyanic acid. The absorption of the hydrocyanic acid is advantageously carried out at a temperature below 40° C., and preferably at ordinary temperature. The catalyst is led out of the absorption vessel into a reaction tower which is heated, for example, at 70–100° C. and advantageously 80–90° C., and through which is passed a stream of acetylene, if desired, diluted with an inert gas. The acrylonitrile formed is removed with the gas stream, and absorbed in water or condensed by cooling, and then purified by distillation. The excess of acetylene is reintroduced into the reaction tower and at least a part of the used catalyst is also recycled, after being cooled, advantageously to a temperature below 40° C., by returning it to the absorption vessel where it is recharged with hydrocyanic acid.

Referring now to the accompanying drawings,

Fig. 1 is a diagrammatic illustration of a first embodiment apparatus according to the invention;

Fig. 2a is a diagrammatic illustration of a modification of apparatus with two series-arranged absorption vessels;

Fig. 2b is a diagrammatic illustration of a modification of apparatus, particularly intended for use with two gases, one containing HCN and the other $C_2H_2$ in a dilute form.

Figure 3:
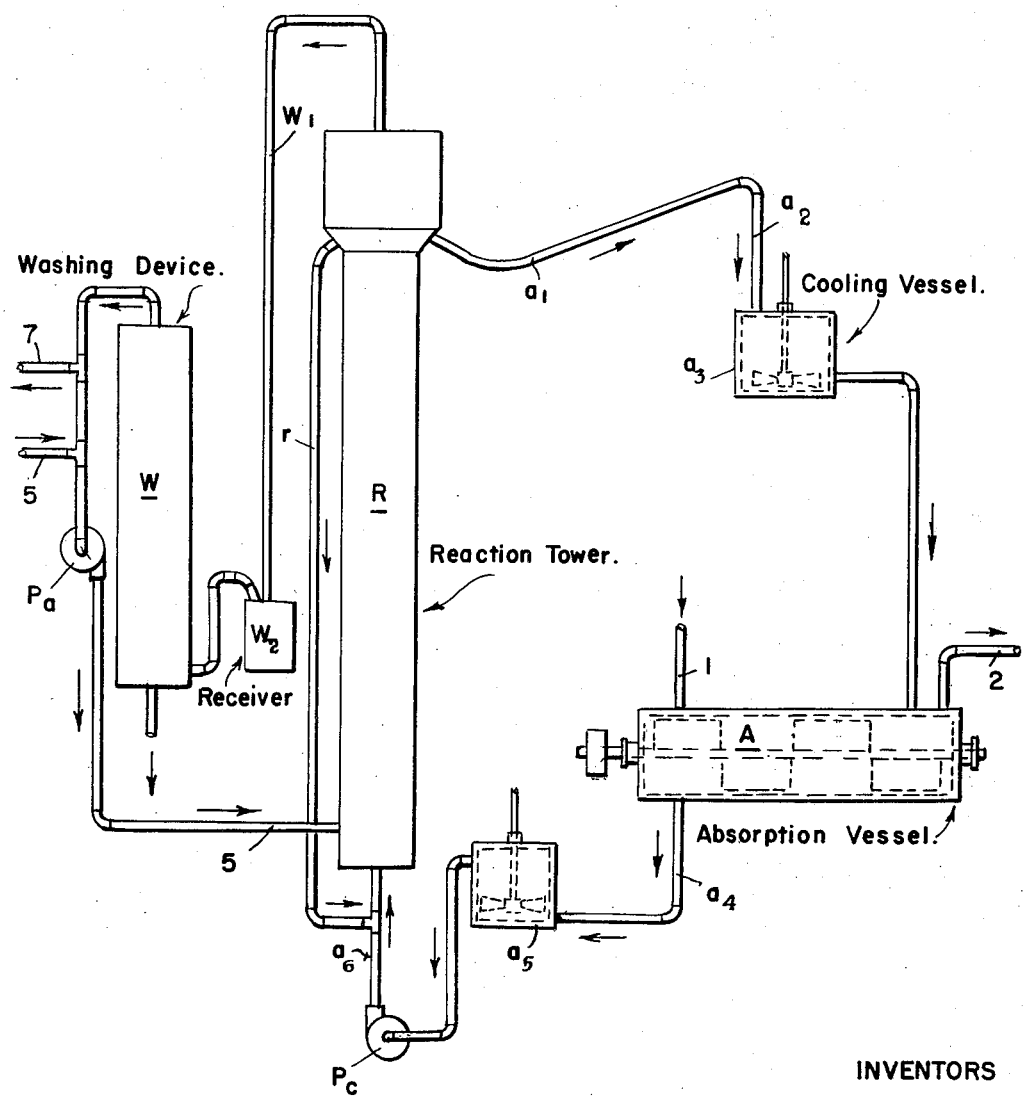
Fig. 3 is a diagrammatic illustration of still another apparatus embodiment according to the invention.

Apparatus for carrying out the continuous process is shown diagrammatically in Figure 1 of the accompanying drawings. In these drawings all details are omitted in order better to indicate the principle of the apparatus. The apparatus consists mainly of two parts, namely an absorption vessel A provided with powerful stirring mechanism and a reaction tower R. The absorption vessel has a gas inlet pipe 1 through which the crude gas containing hydrocyanic acid is introduced, a gas outlet pipe 2 through which the waste gas freed from hydrocyanic acid leaves the vessel, and also an inlet pipe 3 and an outlet pipe 4 for the catalyst. The two last-mentioned pipes connect the absorption vessel to the reaction tower which is provided with an inlet pipe 5 for the acetylene and an outlet pipe 6 for the acetylene laden with acrylonitrile. The latter gas after leaving the reaction tower passes through a washing apparatus W in which the acrylonitrile is washed out of the gas. In the outlet pipe 4 for the catalyst is provided a pump P which pumps the catalyst from the absorption vessel A into the reaction tower R.

The apparatus is so constructed that, on the one hand, the catalyst is maintained in circulation and, on the other, the unconsumed acetylene can be re-circulated through the reaction tower, although a part of the acetylene contaminated with by-products can be removed through a pipe 7 for waste gas.

When the absorption of the hydrocyanic acid is carried out at a temperature below 40° C., the catalyst mixture must be powerfully stirred in the absorption vessel so that the solid constituents which it contains or which are formed therein are maintained in a state of fine subdivision.

The acetylene necessary for the synthesis may be used in a concentrated form or, if desired, may be diluted with an inert gas such as nitrogen. Acetylene from an electric arc is also suitable, and is advantageously used in a purified and enriched form.

Preferably the gas mixture used as the source of acetylene should contain not less than about 15 to 20 per cent of acetylene. However, it is possible to use gas mixtures having lower concentrations of acetylene as will be described below.

As the source of hydrocyanic acid there may be used a gas containing hydrocyanic acid, and preferably one which does not contain large amounts of constituents which would substantially reduce the life of the catalyst. There come primarily into consideration gaseous mixtures such as are obtained directly in the manufacture of hydrocyanic acid in the gaseous phase, if necessary, after removing harmful constituents. There is suitable, for example, the gaseous mixture resulting from the synthesis of hydrocyanic acid in an electric arc by the method of Andriessen. Such a gas contains about 0.5 to 1.5 per cent. by volume of hydrocyanic acid, which can be almost completely absorbed by the Nieuwland catalyst. As a source of hydrocyanic acid there may also be used, the gas resulting from the synthesis of hydrocyanic acid by the method of Andrussow or the gas resulting from the distillation of molasses residues.

When there is used as the source of hydrocyanic acid a gaseous mixture which, as in the case, for example, of the gaseous mixture resulting from the production of hydrocyanic acid in an electric arc by the process of Andriessen as referred to above, which still contains in addition to hydrocyanic acid acetylene in a relatively dilute form, this acetylene can also be utilized. This may be done in various ways. The gaseous mixture may be introduced into the absorption vessel into the cold catalyst, so that initially both of the gases, namely the hydrocyanic acid and the acetylene, are absorbed. As the concentration of the combined hydrocyanic acid increases the absorbed acetylene is driven out. By adjusting the rate of circulation of the catalyst the absorption may be carried out in such manner that in continuous operation only the hydrocyanic acid is absorbed and the acetylene leaves the absorption vessel together with other waste gases through the pipe 2 shown in Figure 1. The acetylene from this waste gas can be concentrated by absorption in water under pressure, and then used for the synthesis by introducing it through the pipe 5 into the apparatus shown in Figure 1. It is also possible to absorb the acetylene and hydrocyanic acid simultaneously in the catalyst, that is to say, by maintaining during the whole synthesis the initial conditions of the process just described. This can be brought about by suitably adjusting the ratio of the amount of gas to be absorbed and the speed of re-circulation of the catalyst. In this form of the process the introduction of further acetylene through the pipe 5 in the Figure 1 is not necessary. Instead of absorbing the hydrocyanic acid and the acetylene in a single absorption vessel it is also possible to absorb the two gases separately in two absorption vessels arranged in series. Such an arrangement is shown in Figure 2a. This form of the process enables the most favourable absorption conditions for each of the two gases to be chosen. This will be explained with reference to Figure 2a. The gas mixture containing the hydrocyanic acid and acetylene is introduced through the pipe 1 into the absorption vessel $A_1$, in which the hydrocyanic acid is absorbed by the catalyst, which latter is introduced through the pipe $4_1$. The gas freed from hydrocyanic acid is passed through the pipe 2 into an absorption vessel $A_2$, where the acetylene is absorbed in the catalyst, which latter is introduced through the pipe $4_2$. The waste gas passes out through the pipe 3. The catalyst charged with hydrocyanic acid and acetylene passes from the pipes $5_1$ and $5_2$, which lead to the pipe 6, and thence into the reaction tower. A similar arrangement for carrying out this form of the process is one in which two gases are used, one containing hydrocyanic acid and the other acetylene in a dilute form. Such an arrangement is shown diagrammatically in Figure 2b. The pipe 1 serves for introducing gas containing hydrocyanic acid and the pipe 2 for introducing the gas containing acetylene. $A_1$ and $A_2$ are the respective absorption vessels, into which the catalyst is introduced through pipes $4_1$ and $4_2$, respectively. The pipes 3 serve for leading off the residual gases. The catalyst charged with hydrocyanic acid and acetylene passes through the pipes $5_1$ and $5_2$ and the pipe 6 into the reaction tower. In these two forms of the process it is also possible to carry out an absorption of the gas, notably the acetylene, under superatmospheric pressure.

Although the forms of the process are explained by reference to the diagrammatic Figures 1, 2a and 2b, they need not necessarily be carried out with these special arrangements.

It is also known that in the synthesis of acrylonitrile from hydrocyanic acid and acetylene by-products are obtained a part of which collects in the catalyst and constitute resin-like or greasy products. By interposing a separating vessel between the reaction tower and the absorption vessel it is possible to remove a part of these by-products from the catalyst. It is also of advantage to free the catalyst issuing from the reaction tower from volatile compounds dissolving therein before returning it to the absorption vessel, because in this way its absorption capacity is increased. Advantageously the synthesis is carried out in a gaseous atmosphere which is completely free from oxygen.

The process of the invention enables the hydrocyanic acid from dilute gaseous hydrocyanic acid to be utilized without previous concentration by way of an alkali cyanide or alkaline earth metal cyanide, and also makes it possible to use dilute acetylene for the synthesis of acrylonitrile.

The following examples illustrate the invention:

Example 1

In this example the apparatus shown diagrammatically in Figure 3 is used. The apparatus consists essentially of a reaction tower R, an absorption vessel A and a washing device W. The reaction tower, which can be heated, contains a branch pipe $r$ through which hot catalyst can recirculate through the tower. The reaction tower is connected with the absorption vessel by a system of pipes $a_1$, $a_2$ and $a_3$. In this system the catalyst is cooled. The stirring mechanism in the cooling vessel $a_3$ serves to inhibit the separation of coarse crystals. The catalyst is returned by way of the system $a_4$, $a_5$ and $a_6$. The stirring device shown at $a_5$ serves the same purpose as that at $a_3$. The catalyst is slowly heated in the pipe $a_6$. Circulation of the cold catalyst is maintained by the pump Pc. The reaction tower is connected with the washing device W for the acrylonitrile. By cooling the gases issuing from the upper end of the reaction tower in the pipe $w_1$ a part of the acrylonitrile separates and is collected in liquid form in the vessel $w_2$. The uncondensed acrylonitrile vapour is dissolved out of the gaseous mixture in the main washing device W by means of water. The pipe 5 serves for the introduction of fresh acetylene and for maintaining the circulation of acetylene, which is brought about by the pump Pa. Through the pipe 7 a part of the recirculated acetylene is removed together with impurities.

The gas containing hydrocyanic acid in diluted form is introduced through the pipe 1, and the waste gases are led away through the pipe 2.

A period of synthesis is started by charging the reaction tower (which has a capacity of one liter) and the pipes for the catalyst with about 3 liters of Nieuwland catalyst, which is somewhat diluted so as to have a density of 1.5. 1 liter of the catalyst is present in the reaction tower while the remainder thereof is distributed in the pipes and the absorption vessel. At the outset 10 grams of hydrocyanic acid per liter of catalyst are added thereto in order to reduce the tendency for crystallization to occur. The temperature in the reaction tower is brought to 85–90° C., and the catalyst enters the absorption vessel at a temperature of 30–40° C. and leaves it at 20–25° C.

At the outset of the synthesis nitrogen is passed through the system for the circulation of the acetylene, and at the same time there is passed through the absorption vessel, which has a capacity of about 5 liters, a gas mixture containing 6.5 grams of hydrocyanic acid per cubic meter at the rate of 1.8 cubic meters per hour. By means of the pump Pc the catalyst from the absorption vessel, which is charged with hydrocyanic acid, is pumped at a speed of about 5 liters per hour into the reaction tower where it mixes with the catalyst contained therein and is thus heated to 85–90° C. As soon as the current of nitrogen leaving the reaction tower contains about 0.5 gram of hydrocyanic acid per 100 liters, the nitrogen is replaced by acetylene. The latter gas is poured through the apparatus at a recirculating volume of 50 liters per hour.

The acrylonitrile formed is recovered from the stream of acetylene in part in the receiver $w_2$ by direct condensation in the condenser $w$ and in part by absorption in water in the washing device $W$, about 1.2 liters of water per hour being required.

In a period of 56 hours the mean rate of production of acrylonitrile amounts to about 16 grams per hour, which corresponds to about 70 per cent. of the quantity of hydrocyanic acid introduced into the absorption vessel.

*Example 2*

The apparatus used in this example is the same as that used in Example 1 except that a reaction tower having a capacity of 2.5 to 3 liters is used. The pipe for the supply of fresh acetylene is closed so that only the acetylene in circulation is used.

A catalyst having a density of 1.5 is used in a total volume of about 5 liters. At the beginning of the period of synthesis the apparatus is charged with the catalyst, and at the same time the system for the circulation of acetylene is filled with nitrogen. A gaseous mixture, which contains 9 grams of hydrocyanic acid per cubic meter, 70 liters of crude acetylene per cubic meter (obtained from the manufacture of acetylene in an electric arc) and nitrogen, is introduced into the absorption vessel at a speed of throughput of 1.5 cubic meters per hour. The catalyst charged with hydrocyanic acid and acetylene is poured by means of the pump Pc into the reaction tower at a rate of throughput of about 15 to 25 liters per hour, a certain quantity of gas also being introduced into the reaction tower. In the reaction tower a part of the acetylene reacts with the hydrocyanic acid to form acrylonitrile, while the remainder passes to the system for the circulation of acetylene. In this system which is initially filled with nitrogen, the nitrogen is gradually replaced by acetylene. The gas, which finally contains about 25–40 per cent of acetylene, circulates at a speed of 150–200 liters per hour. Gases are withdrawn from the cycle through the pipe for waste gases at the rate of 5 liters per hour.

The acrylonitrile is recovered in the manner described in Example 1. In a period of synthesis lasting 7 days the production of acrylonitrile amounts on the average to 16 grams per hour, but it reaches 22 grams per hour at times.

*Example 3*

The apparatus used in this example is the same as that described in Example 2. The experimental conditions are the same, except that instead of crude acetylene purified acetylene is used. Into the absorption vessel is introduced a gaseous mixture which contains 9 grams of hydrocyanic acid per cubic meter and 70–77 liters of purified acetylene per cubic meter and nitrogen at a rate of throughput of 1.56 cubic meters per hour. The circulating gas contains about 17–21 per cent of acetylene and is poured through the system at a recirculating volume of 250 liters per hour. 25 liters per hour of waste gas are removed, which is replaced by pouring in fresh gas by means of the pump Pc together with the catalyst.

In a period of 8½ hours the production of acrylonitrile amounts to 20 grams per hour.

What we claim is:

1. A process for the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into contact with an aqueous acidic cuprous salt catalyst at a temperature below about 60–65° C., whereby the dilute gaseous hydrocyanic acid is in effect concentrated by absorption of the HCN by the said catalyst with no formation of acrylonitrile, and then, in a second stage, synthesizing acrylonitrile by bringing the HCN-charged catalyst into contact with acetylene at a temperature of at least 70° C.

2. A process for the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into contact with an aqueous acidic cuprous chloride catalyst at a temperature below about 60–65° C., whereby the dilute gaseous hydrocyanic acid is in effect concentrated by absorption of the HCN by the said catalyst with no formation of acrylonitrile, and then, in a second stage, synthesizing acrylonitrile by bringing the HCN-charged catalyst into contact with the acetylene at 70–100° C.

3. A process for the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into contact with an aqueous acidic cuprous chloride catalyst at a temperature below 40° C., whereby the dilute gaseous hydrocyanic acid is in effect concentrated by absorption of the HCN by the said catalyst with no formation of acrylonitrile, and then, in a second stage, synthesizing acrylonitrile by bringing the HCN-charged catalyst into contact with acetylene at 70–100° C., recycling at least part of the catalyst back to the first stage.

4. A process for the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into contact with an aqueous acidic cuprous chloride catalyst at a temperature below 40° C., whereby the dilute gaseous hydrocyanic acid is in effect concentrated by absorption of the HCN by the said catalyst with no formation of acrylonitrile, and then, in a second stage, synthesizing acrylonitrile by bringing the HCN-charged catalyst into contact with acetylene at 80–90° C., recycling at least part of the catalyst back to the first stage.

5. A process for the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into contact with an aqueous acidic cuprous chloride catalyst at a temperature below 40° C., whereby the dilute gaseous hydrocyanic acid is in effect concentrated by absorption of the HCN by the said catalyst with no formation of acrylonitrile, and then, in a second stage, synthesizing acrylonitrile by bringing the HCN-charged catalyst into contact with acetylene at 80–90° C., recycling excess acetylene back to the second stage and at least part of the catalyst back to the first stage.

6. A process for the manufacture of acrylonitrile by the additive combination of hydrocyanic acid and acetylene, which comprises in a first stage, bringing a dilute gaseous HCN-acetylene mixture, containing less than 20% HCN, into contact with an aqueous acidic cuprous chloride catalyst at a temperature below 40° C., whereby the hydrocyanic acid and acetylene are absorbed by said catalyst with substantially no formation of acrylonitrile, the dilute gaseous HCN being thus effectively concentrated, and then, in a second stage, synthesizing acrylonitrile by heating the gas-charged catalyst to 70–100° C.

7. A process according to claim 6, wherein the absorption of hydrocyanic acid and acetylene is performed in a single absorber.

8. A process according to claim 6, wherein the absorption of hydrocyanic acid and acetylene is performed in two separate absorbers.

9. A process for the manufacture of acrylonitrile by the additive combination of hydrocyanic acid and acetylene, starting from a dilute gaseous hydrocyanic acid which contains less than 20% HCN, which comprises, in a first stage, concentrating the said dilute gaseous hydrocyanic acid by bringing it into intimate contact with an aqueous acidic cuprous chloride catalyst at a temperature below 40° C. whereby the HCN is in effect concentrated by and absorbed by the catalyst and the dilute gaseous hydrocyanic acid is effectively concentrated, and separately bringing dilute gaseous acetylene into intimate contact with an aqueous acidic cuprous chloride catalyst at a temperature below 40° C., whereby the acetylene is absorbed by the last-named catalyst and, in a second stage, admixing the respective gas-charged catalysts and heating the same to 70–100° C. whereby acrylonitrile is synthesized.

References Cited in the file of this patent

UNITED STATES PATENTS

| Number | Name | Date |
|---|---|---|
| 2,385,327 | Bradley et al. | Sept. 25, 1945 |
| 2,385,469 | Salley | Sept. 25, 1945 |
| 2,385,470 | Salley et al. | Sept. 25, 1945 |
| 2,409,124 | Heuser | Oct. 8, 1946 |
| 2,417,068 | Farlow et al. | Mar. 11, 1947 |

OTHER REFERENCES

Hasche et al., Fiat Final Report No. 836, Office of Military Govt. for Ger., pp. 4–7 (July 18, 1946).

Matthews PB 47,715 British Intelligence Objectives Sub-Committee, pp. 1–2 (received 1948).